United States Patent
Boldyrev et al.

(10) Patent No.: US 8,547,232 B2
(45) Date of Patent: Oct. 1, 2013

(54) METHOD AND APPARATUS FOR TRANSFERRING DATA VIA RADIO FREQUENCY (RF) MEMORY TAGS

(75) Inventors: Sergey Boldyrev, Söderkulla (FI); Mikko Sakari Haikonen, Espoo (FI); Jari-Jukka Harald Kaaja, Järvenpää (FI); Jarmo Tapani Arponen, Espoo (FI); Joni Jorma Marius Jantunen, Helsinki (FI)

(73) Assignee: Nokia Corporation, Espoo (FI)

( * ) Notice: Subject to any disclaimer, the term of this patent is extended or adjusted under 35 U.S.C. 154(b) by 529 days.

(21) Appl. No.: 12/790,367

(22) Filed: May 28, 2010

(65) Prior Publication Data

US 2011/0291834 A1 Dec. 1, 2011

(51) Int. Cl.
*G08B 13/14* (2006.01)
*H04Q 5/22* (2006.01)

(52) U.S. Cl.
USPC ...................... 340/572.1; 340/10.1

(58) Field of Classification Search
USPC ........................................ 340/10.1
See application file for complete search history.

(56) References Cited

U.S. PATENT DOCUMENTS

| | | | | |
|---|---|---|---|---|
| 5,565,858 | A * | 10/1996 | Guthrie | ...................... 340/10.33 |
| 7,489,240 | B2 | 2/2009 | Soliman | |
| 7,607,026 | B2 | 10/2009 | Squibbs et al. | |
| 7,663,486 | B2 | 2/2010 | Schuessler | |
| 2003/0120745 | A1 | 6/2003 | Katagishi et al. | |
| 2005/0188167 | A1 * | 8/2005 | Squibbs et al. | ............... 711/163 |
| 2005/0242176 | A1 | 11/2005 | Roberge et al. | |
| 2006/0087407 | A1 * | 4/2006 | Stewart et al. | ............. 340/10.52 |
| 2007/0095928 | A1 | 5/2007 | Balinsky et al. | |
| 2007/0109124 | A1 * | 5/2007 | Park et al. | .................. 340/572.1 |
| 2007/0159330 | A1 | 7/2007 | Chakraborty et al. | |
| 2007/0210923 | A1 | 9/2007 | Butler et al. | |
| 2007/0279189 | A1 * | 12/2007 | Park | ............................ 340/10.1 |
| 2010/0019887 | A1 | 1/2010 | Bridgelall et al. | |
| 2010/0207721 | A1 * | 8/2010 | Nakajima et al. | ............... 340/5.3 |

FOREIGN PATENT DOCUMENTS

| | | | |
|---|---|---|---|
| GB | 2 418 760 A | 4/2006 | |
| GB | 2 419 713 A | 5/2006 | |
| GB | 2 446 175 A | 8/2008 | |

(Continued)

OTHER PUBLICATIONS

U.S. Appl. No. 12/552,094, filed Sep. 1, 2009, Sergey Boldyrev.

(Continued)

*Primary Examiner* — Brian Zimmerman
*Assistant Examiner* — Cal Eustaquio
(74) *Attorney, Agent, or Firm* — Ditthavong Mori & Steiner, P.C.

(57) ABSTRACT

An approach is presented for transferring data via radio frequency (RF) memory tags. The UE manager receives a request, at a device, to grant access for interaction between a first RF memory tag and a second RF memory tag, the first RF memory tag associated with one or more trusted storage. Further, the UE manager determines an accessibility state of the first RF memory tag, the one or more trusted storage, or a combination thereof. Then, the UE manager causes, at least in part, granting of the access based, at least in part, on the accessibility state. The access is via a connection between the first RF memory tag and the second RF memory tag.

20 Claims, 12 Drawing Sheets

(56) References Cited

FOREIGN PATENT DOCUMENTS

| | | |
|---|---|---|
| JP | 2006-146361 A | 6/2006 |
| KR | 10-2008-0075323 A | 8/2008 |
| KR | 10-2008-0103951 A | 11/2008 |
| WO | WO 2005/008575 A1 | 1/2005 |

OTHER PUBLICATIONS

U.S. Appl. No. 12/621,844, filed Nov. 19, 2009, Sergey Boldyrev.

U.S. Appl. No. 12/696,873, filed Jan. 29, 2010, Sergey Boldyrev.

U.S. Appl. No. 61/324,588, filed Apr. 15, 2010, Jarmo Tapani Arponen.

A URN Namespace of Object Identifiers, RFC 3061, Mealling, Feb. 2001. Accessed: https://www2.ietf.org/rfc/rfc3061.txt.

Markets in Financial Instruments Directive. Accessed: Jul. 23, 2010, http://en.wikipedia.org/wiki/Markets_in_Financial_Instruments_Directive, pp. 1-5.

OID Registry. Accessed: Aug. 23, 2010, http://www.hl7.org/Oid/index.cfm.

Dontharaju et al., "The Unwinding of Protocol," IEEE Applications & Practice, Apr. 2007, vol. 45, No. 4, pp. 4-10.

International Search Report for corresponding PCT Application No. PCT/FI2011/050285, Jun. 27, 2011, pp. 1-8.

Kaasinen et al., "Ubimedia based on readable and writable memory tags," Multimedia Systems, Feb. 2010, vol. 16, No. 1, pp. 57-74.

Kosta et al., "Ethical-Legal Challenges in User-Centric Aml Services," Proceedings of the Third International Conference on Internet and Web Applications and Services, Jun. 8-13, 2008.

Written Opinion for corresponding PCT Application No. PCT/FI2011/050285, Jun. 27, 2011, pp. 1-10.

\* cited by examiner

100

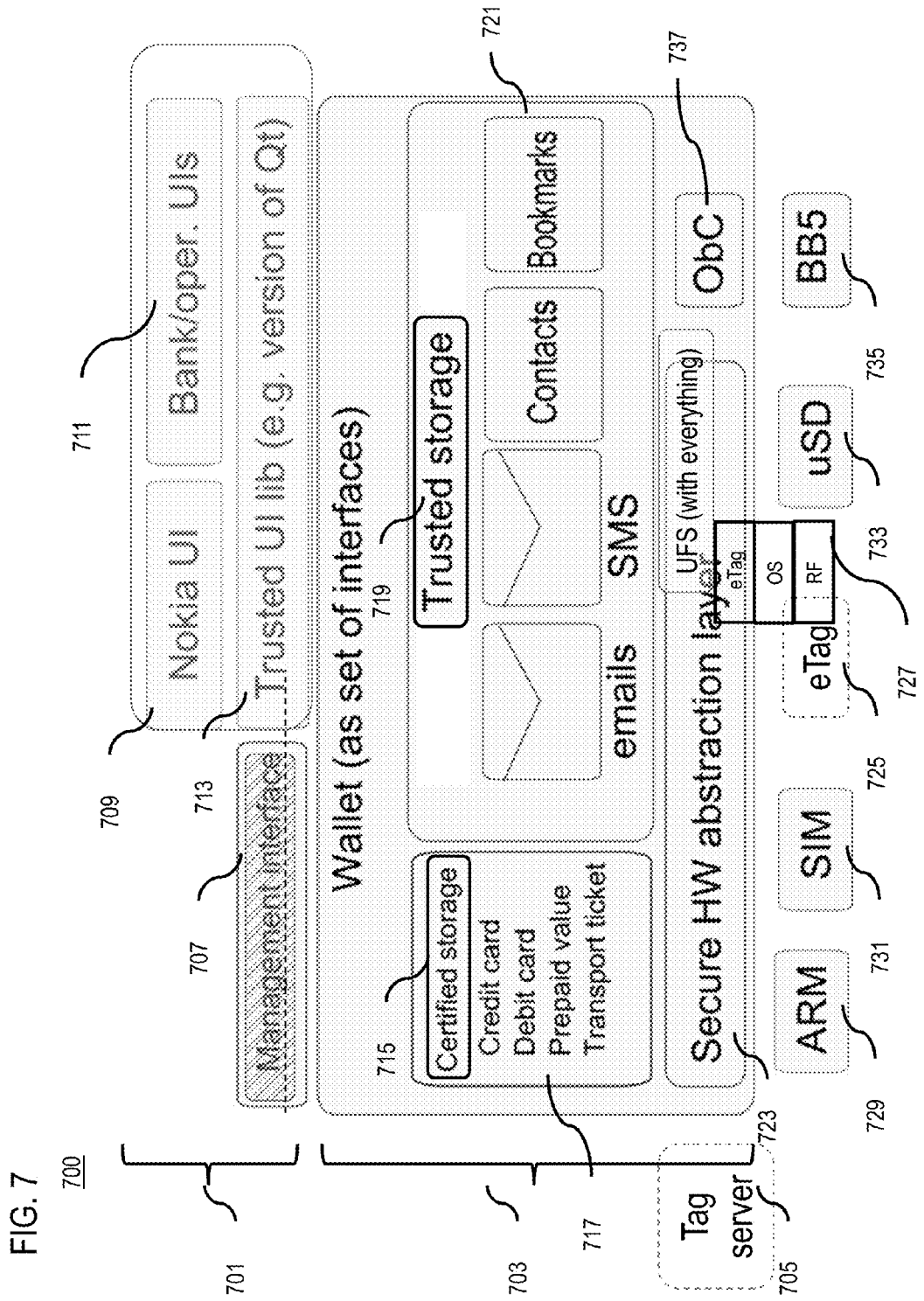

METHOD AND APPARATUS FOR TRANSFERRING DATA VIA RADIO FREQUENCY (RF) MEMORY TAGS

BACKGROUND

Service providers and device manufacturers (e.g., wireless, cellular, etc.) are continually challenged to deliver value and convenience to consumers by, for example, providing compelling network services. One area of interest has been the development of digital wallets and other similar means for storing information, transferring information, conducting related transactions, and the like. At the same time, development has also progress in the use of memory tags (e.g., tags employing short range radio technology) for facilitating wireless information transfer. Accordingly, service providers and device manufacturers face significant challenges to enabling effective mechanisms for performing secure transfer of data (e.g., financial data, personal data, etc.) via memory tags.

SOME EXAMPLE EMBODIMENTS

Therefore, there is a need for an approach for efficiently transferring of data via memory tags such as radio frequency (RF) memory tags and storing of the data (e.g., content, credentials, configurations, etc.) in a storage area of an active or passive end point.

According to one embodiment, a method comprises receiving a request, at a device, to grant access for interaction between a first RF memory tag and a second RF memory tag, the first RF memory tag associated with one or more trusted storage. The method also comprises determining an accessibility state of the first RF memory tag, the one or more trusted storage, or a combination thereof. The method further comprises causing, at least in part, granting of the access based, at least in part, on the accessibility state. The access is via a connection between the first RF memory tag and the second RF memory tag.

According to another embodiment, an apparatus comprising at least one processor, and at least one memory including computer program code, the at least one memory and the computer program code configured to, with the at least one processor, cause, at least in part, the apparatus to receive a request, at a device, to grant access for interaction between a first RF memory tag and a second RF memory tag, the first RF memory tag associated with one or more trusted storage. The apparatus is also caused to determine an accessibility state of the first RF memory tag, the one or more trusted storage, or a combination thereof. The apparatus is further caused to cause, at least in part, granting of the access based, at least in part, on the accessibility state. The access is via a connection between the first RF memory tag and the second RF memory tag.

According to another embodiment, a computer-readable storage medium carrying one or more sequences of one or more instructions which, when executed by one or more processors, cause, at least in part, an apparatus to receive a request, at a device, to grant access for interaction between a first RF memory tag and a second RF memory tag, the first RF memory tag associated with one or more trusted storage. The apparatus is also caused to determine an accessibility state of the first RF memory tag, the one or more trusted storage, or a combination thereof. The apparatus is further caused to cause, at least in part, granting of the access based, at least in part, on the accessibility state. The access is via a connection between the first RF memory tag and the second RF memory tag.

According to another embodiment, an apparatus comprises means for receiving a request, at a device, to grant access for interaction between a first RF memory tag and a second RF memory tag, the first RF memory tag associated with one or more trusted storage. The apparatus also comprises means for determining an accessibility state of the first RF memory tag, the one or more trusted storage, or a combination thereof. The apparatus further comprises means for causing, at least in part, granting of the access based, at least in part, on the accessibility state. The access is via a connection between the first RF memory tag and the second RF memory tag.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 7 is an example diagram showing various components of the UE 101, according to one embodiment;

DESCRIPTION OF SOME EMBODIMENTS

Examples of a method, apparatus, and computer program for transferring data via radio frequency (RF) memory tags are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term information space or smart space can be considered as an information set aggregated from a variety of different and distributed sources. The multi-sourcing of information gives an information space great flexibility and accounts for the fact that the same piece of information can come from different sources and different owners. For example, sensitive information (e.g., financial account information, healthcare records, etc.) can appear in the same information space from multiple sources (e.g., locally stored records, a hospital database, a doctor's database, etc.). In one embodiment, information within the information space or smart space is represented using Semantic Web standards such as Resource Description Framework (RDF), RDF Schema (RDFS), OWL (Web Ontology Language), FOAF (Friend of a Friend ontology), rule sets in RuleML (Rule Markup Language), etc. Furthermore, as used herein, RDF refers to a family of World Wide Web Consortium (W3C) specifications originally designed as a metadata data model. It has come to be used as a general method for conceptual description or modeling of information that is implemented in web resources; using a variety of syntax formats. Although various embodiments are described with respect to information spaces and RDF, it is contemplated that the approach described herein may be used with other distributed information sets and/or data syntax formats. Further, an object identifier (OID) may be used (e.g. ISO/IEC 8824-1:2002 defined OID codes) for OID codes associated with healthcare or hospital settings. For example, in a radiology setting, if a link between the specific radiology device and a patient needs to be established, the OID may be used as a reference to the specific radiology device.

Figure 1:
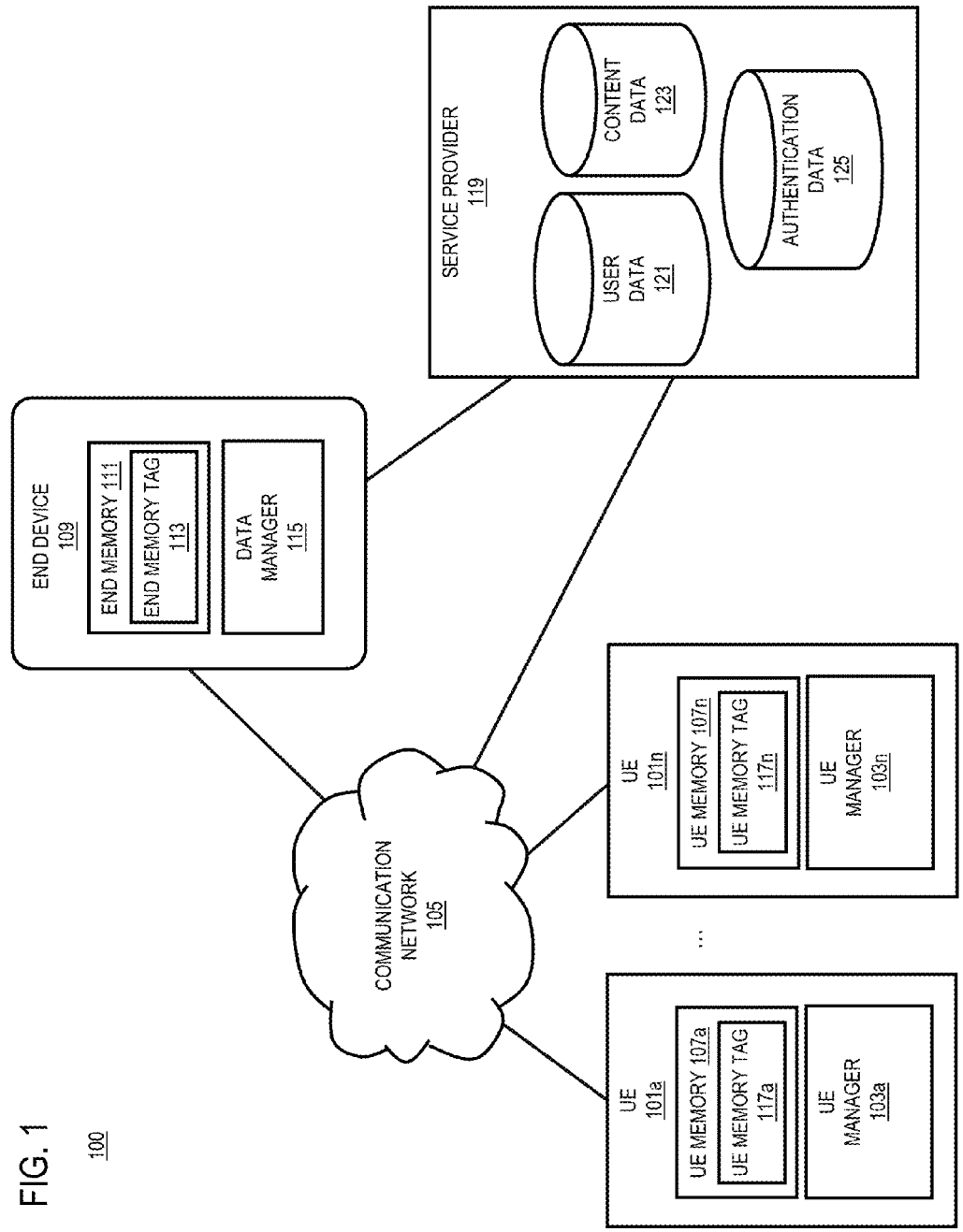
FIG. 1 is a diagram of a system capable of transferring data via radio frequency (RF) memory tags, according to one embodiment.

FIG. 1 is a diagram of a system capable of transferring data via RF memory tags, according to one embodiment. As discussed previously, the transfer of information using means such as a digital wallet is becoming more common. The digital wallet provides convenience partly because the digital wallet can carry information in a digital form that can be processed easily. The information carried in the digital wallet may include information useful for the user of the digital wallet such as trusted or secured information. However, like other types of digital devices, the digital wallet may be susceptible to unwanted access or attacks from other devices. Further, the digital wallet may be lost or stolen or may become non-functional, thus causing loss of information contained in the digital wallet. Therefore, a digital wallet that provides security in its uses and protects its content from other circumstances is desired, while utilizing communication via a RF memory tag connected to or embedded in the digital wallet to facilitate the exchange of information. Further, the digital wallet may provide flexibility in that some portions of information stored in the digital wallet (e.g., information related to credit cards) may be carried in the digital wallet or left in a safe storage area. For example, a user may choose to carry credit card information in the user's digital wallet or may choose to leave the credit card information at the user's home computer, especially because the user may consider the user's home computer a safer place to store the credit card information.

To address this problem, a system 100 of FIG. 1 introduces a mechanism to securely transfer information between RF memory tags based on the accessibility state of the RF memory tags. The accessibility state of the RF memory tags may be considered to determine whether to enable interaction between the RF memory tags, and the accessibility state is determined based on various factors and conditions such as the lock/unlock state of the UE 101 as well as authentication information and etc. The information may be related to financial transactions, financial information, medical information and transactions, personal information, privileged information, sensitive information, classified information, or a combination thereof. The access for transferring information between the RF memory tags is via a connection established between the RF memory tags, as the request for the access is received at the device. The access may be an operation of writing from one RF memory tag to another RF memory tag. In one embodiment, the content may be transferred from a second RF memory tag to a first RF memory tag, and then an untrusted storage associated with the first RF memory tag. Then, the content from the untrusted storage may be transferred to a trusted storage, based on the granting of the access. The UE memory 107 may include both the untrusted storage and the trusted storage. The untrusted storage is for data that need no security or protection, whereas the trusted storage is used to store data that need security or protection, wherein various levels of security may be provided for different types of trusted storage.

Additionally, the data may be assigned to the trusted or the untrusted storage based on the security level of the data itself. For example, if the data is virus scanned, its security level is high and thus may be assigned to the trusted storage. As another example, if the data is flagged as a possible malware, then the data may be assigned to the untrusted storage. Further, in one embodiment, the mechanism checks whether the RF memory tag or related storage device is in a locked state or whether the transaction involving the RF memory tags is prevented. If there is such locked state or prevention of the transaction, then the accessibility state may be set such that the transfer of information may be limited or blocked. In one embodiment, the RF memory tag or the related storage checks for authentication information to determine whether to allow writing of the transferred data into the RF memory tag or the related storage and where the transferred data is to be stored. Thus, the accessibility state may be based on the authentication information. Further, in one embodiment, there are various types of storage locations, and granting of the access may be also based on the storage location selected based on characteristics of the access. In addition, the access may be recorded, and stored in an available storage location, so as to maintain a history of the access and transfer of information involving the access.

More specifically, system 100 enables receiving a request at the UE 101 to grant access for interaction between the UE memory tag 117 of the UE 101 and the end memory tag 113 of the end device 109, and the UE 101 determines an accessibility state of the UE memory tag 117 or related storage device within the UE memory 107. The UE memory tag 117 and the end memory tag may be RF memory tags. The UE 101 may include a user interface that may be used to make the request at the UE 101, or to enter any other commands, or to display results or process of the interaction between the UE memory tag 117 and the end memory tag 113, or any other tasks. Once the accessibility state is determined, the UE 101 grants the access based on the accessibility, wherein the access is via a connection between the UE memory tag 117 and the end memory tag 113. The connection may be established via the communication network 105. The connection may be blocked or prevented if the UE 101 is in a locked state. The UE 101 may be placed in a locked state if the UE 101 is reported as stolen or lost. For example, a user may report to the service provider that the UE 101 is stolen or lost, and then the service provider may transmit a command to the UE 101 that locks the UE 101. There may be additional limitations that are considered in granting of the access. The examples of the additional limitations may include the time limit of the access (i.e. how long the UE 101 can be connected to another device), the type of the target device, type of the target content, the type of the connection, etc.

In one embodiment, the content stored within the UE 101 as well as the content in the end device 109 may be synchronized with the service provider 119 to store the content in the server, as a way to backup the content or otherwise provide for more storage capacity. Thus, the service provider 119 may include user data storage 121 for storing data about the user's information such as a user profile and any other information related to the user of the UE 101. The service provider 119 may further include a content data storage 123 to store any type of data, including data from the UE 101 as well as the end device 109, and also include the authentication data storage 125 to include authentication information such as a user ID and a password, UE specific authentication information, any authentication information related to the end device, etc. In one example, if the UE 101 or the end device 109 is stolen or lost, a user can acquire a new UE 101 or a new end device 109 and synchronize with the service provider 119 to obtain the content that was backed up in the service provider. For the new device to synchronize with the service provider 119, a user may need to enter information specifying the device content, such as a device ID or an account ID related to the lost or stolen device.

The content to be transferred from the end device 109 to the UE 101 may include a wide range of content types. For example, the content may include finance related information such as financial transaction and financial account information. In one example, the UE 101 may include a digital wallet, and the end device 109 may act as a pay station, such that the financial transaction may be performed between the digital wallet of the UE 101 and the end device 109 as the user of the UE 101 uses the UE 101 to make payments by communicating with the end device 109. The digital wallet may include some components of the UE 101 and may be connected to other components of the UE 101 to perform the function of the digital wallet. Further, the content may be any type of personal information such as a medical history, a social security information and etc., and may also be privileged information that may include attorney-client privilege, doctor-patient privilege. The content may also include digital media such as images, video, audio, documents and etc. In one embodiment, the access may relate to obtaining consent information, such as a patient consent to a doctor's treatment, a client's consent, etc. The access may be granted based on the consent information (e.g., consent to medical treatment, consent to transfer medical records, consent to conduct transactions, etc.). Thus, the scope of the access may be determined based on the consent information, wherein the scope includes at least a time, a location, a duration, a party, a role of the party, an activity, a record, or a combination thereof. For example, if the consent exists between the UE 101 and the end device 109, then the interaction between the UE 101 and the end device 109 may be allowed, to transfer data. Further, different levels of access may be granted based on the consent information. For example, depending on the consent information, access to the trusted storage area and/or the untrusted storage area in the UE 101 may be granted.

In one embodiment, the UE 101 has a UE memory 107 to store data including user information, authentication information, software application, user interface application, communication information, communication history, digital media (pictures, video and audio files, etc), contact information, web browsing information, and etc. The memory may include a non-volatile memory (NVM) such as a flash memory, universal flash storage/Execute in Place (UFS/XIP) type PCM memory, etc. In one embodiment, the transfer of information to the UE 101 from the data source such as the end device 109 may be based on memory tags (e.g. RF memory tag) associated with the UE 101 and the end device 109, respectively. As an example of the data source including the RF memory tag (e.g. NVM PCM memory and a RF part), the end device 109 may act as a passive end point that is turned off without power or an active end point with power on. For the passive end point, the UE 101 may provide power and data to the passive end point, which is the end device 109 in this example, whereas the end device 109 may provide only data to the active end point UE 101.

In another embodiment, the RF memory tag uses short range connectivity such as Ultra High Frequency/Near Field Communication (UHF/NFC) and/or Impulse based Ultra Wideband (I-UWB). UHF/NFC may be produced by an end unit such as a reader or a writer at the UE 101 and may be used to provide a power field (thus controlling the end device 109 with this power field), whereas I-UWB may be used for data transfer between the RF memory tags of the either the writer device or the reader device, wherein the short range connectivity may be provided as a structure embedded with the RF memory tag or as a peripheral device connected to the RF memory tag. The RF memory tag may also be present as a part of the data source using the end device 109, such that data can be transferred from the data source to the UE 101 using a short range connectivity, wherein the data can be transferred to a RF memory tag embedded in the UE 101 or another storage medium supporting a UFS/XIP memory architecture in the UE 101, for example. Further, this approach may provide a high capacity NVM memory with a RF part providing a high data rate of transfer.

As shown in FIG. 1, the system 100 comprises user equipment (UEs) 101*a*-101*n* having connectivity to UE managers 103*a*-103*n* respectively via a communication network 105. The UE managers 103 may act as an interface between one or more UEs 101 and one or more end devices 109. By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like. The communication network may also involve a connection between a device of an active end point and a device of a passive end point, wherein the active end point provides a power field to the passive end point via a short range radio or wireless connection (e.g. UHF/NFC) and provides a data connection (e.g. I-UWB) between the device of the active end point and the device of the passive end point. In one example, the device of the active end point may be the writer device at the end device 109 and the device of the passive end point may be the RF memory tag with short range wireless connectivity at the UE 101. However, any device may be the active end point or the passive end point.

The UEs 101a-101n is any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), or any combination thereof. It is also contemplated that the UEs 101a-101n can support any type of interface to the user (such as "wearable" circuitry, etc.). In one embodiment, each of the UEs 101a-101n may include a respective memory 107 to store data. The memory 107 may include a UE memory tag 117. In addition or alternatively, the UE memory tag 117 may be external to the UE 101 (e.g., connected via an external dongle device). By way of example, the UE memory tag 117 is a near field communication (NFC) tag, radio frequency identification (RFID) tag, contactless card, a wirelessly powered memory tag, or the like that includes sufficient memory to store information related to the respective UE 101. The UE memory tag 117, for instance, is associated (e.g. embedded in or attached to) one or more of the UEs 101 capable of supporting the information management processes of the approach described herein. In one embodiment, the UE memory tag 117 (e.g. the RF memory tag or embedded RF memory tag) is a high memory capacity NFC tag that contains several gigabits of memory with fast access and download times. It is contemplated that the UE memory tag 117 may also be any similar wirelessly powered memory tag. In one example, UHF/NFC or any radio that provides a power field may power the UE memory tag 117.

By way of example, NFC, RFID, contactless card, and similar technologies are short-range wireless communication technologies (e.g., Ultra High Frequency/Near Field Communication (UHF/NFC) and/or Impulse based Ultra Wideband (I-UWB)) that enable the exchange (e.g., both reading and writing) of data between devices and tags over short distances (e.g., the range for NFC is approximately 4 inches). In general, these technologies comprise two main components, a tag (e.g., attached to a UE 101, as an embedded structure such as a RF memory tag card or as an accessory such as a separate entity that the UE 101 accesses wirelessly) and a reader/writer (which can be implemented within the UE 101). Communication between the reader/writer and the tags occur wirelessly and may not require a line of sight between the devices. The tag (e.g., an RFID transponder) is, for instance, a small microchip that is attached to an antenna. The tags can vary in sizes, shapes, and forms and can be read through many types of materials. Moreover, the tags may be passive tags or active tags. Passive tags are generally smaller, lighter, and less expensive than active tags. Passive tags are only activated when with the response range of a reader/writer. In other words, passive tags are typically memory tags that are wirelessly powered by the reader/writer. The reader/writer emits a low-power radio wave field that is used to power the tag so as to pass on any information that is contained on the chip. Active tags differ in that they incorporate their own power source to transmit rather than reflect radio frequency signals. Accordingly, active tags enable a broader range of functionality like programmable and read/write capabilities. The read/write capabilities of the UE memory tag 117 can, for instance, enable the system 100 to write comments for storage in the UE memory tag 117 for retrieval by other users or update the content of the UE memory tag 117 to include the latest content. For example, the UE memory tag 117 associated with an advertisement can be updated to contain the latest pricing and availability information. The end memory tag 113 may also include the similar functionalities of the UE memory tag. As another example, a memory tag associated with media such as media content, media trailer, or applications, the latest data image, trial versions, configurations, etc. may be updated to contain the up-to-date information or content. In this example, if an external RF memory tag is used and can be plugged to various devices, then local variants as well as device variants may be flashed, at the time of purchase, for example.

A reader/writer device typically contains a transmitter, receiver, control unit, and an antenna, as well as a memory, which may be a high capacity memory storage. The memory may include an embedded tag. The reader/writer performs several primary functions: energizing/powering the tag, demodulating and decoding the returned radio signal, transferring data, and providing clock information. In certain embodiments, a reader/writer includes an additional interface to convert the returned radio signal to a form that can be passed to another system such as a computer or programmable logic controller.

Therefore, the advantage of this approach is that the access for interaction between the RF memory tags are granted based on the accessibility state, and thus provides a measure to selectively allow the interaction between the RF memory tags based on the accessibility state. Therefore, this feature enables secure transactions or secure transfer of information between the RF memory tags. Therefore, means for transferring data via RF memory tags is anticipated.

By way of example, the UE 101, the end device 109, and the service provider 119 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
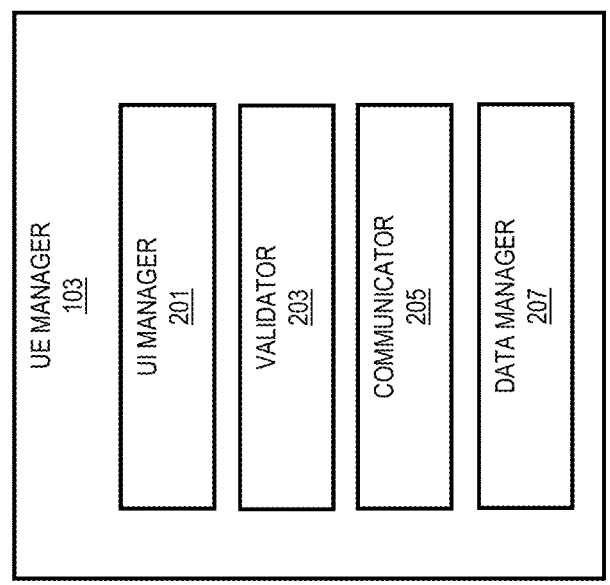
FIG. 2 is a diagram of the components of the UE manager, according to one embodiment.

FIG. 2 is a diagram of the components of the UE manager 103, according to one embodiment. By way of example, the UE manager 103 includes one or more components for managing the UE 101 and the interaction between the UE 101 and other devices and/or service providers. It is contemplated that the functions of these components may be combined in one or more components or performed by other components of equivalent functionality. In this embodiment, the UE manager 103 includes a UI (user interface) manager 201, validator 203, communicator 205 and a data manager 207.

In one embodiment, the UE manager 103 receives a request to grant an access for interaction between the RF memory tags. For example, the user interface at the UE 101 may be used to receive this request. The UI manager 201 may be used to retrieve the request via the user interface of the UE 101 and communicate the request and information included in the request to other components of the UE 101. The information included in the request may contain information about a target device to retrieve the content, a type of content to retrieve from the target device, authentication information to enable access of the UE 101 and/or the end device 109. The UI manager 201 may also retrieve information from other components of the UE 101 and present it via the UE 101. The validator 203 performs various types of validation, authentication, approval and etc., to determine whether to allow a process. For example, the validator 203 may check whether the UE 101 (or the UE memory tag 117 or other trusted storage, for example) is in a locked state. If the validator 203 determines that the UE 101 is in a locked state, the validator 203 may prevent or limit access of some or all components of the UE 101. The locked state may be specific to components of the UE 101, such that only some components of the UE 101 may be in a locked state, while other components are not in a locked state, and thus are accessible. The validator 203 also may validate authentication information (e.g. a user id and a password) entered to access the UE 101. For example, the authentication information may be entered via the user interface, the authentication information may then be processed by the UI manager 201 and sent to the validator 203 for validation. The authentication information provided to the validator 203 may also be the authentication information to access the end device 109 or its components.

The communicator 205 manages various types of communication within the UE 101 (e.g. between the components within the UE 101) and with another device such as the end device 109 or the service provider 119. The communicator 205 may be used to manage communication between the UE memory tag 117 and the end memory tag 113. The communicator 205 may perform synchronization between the UE 101 and the service provider 119, periodically and/or at a user's request or when a condition is satisfied, to copy or transfer data from the UE 101 to the service provider 119. If the UE 101 is lost or stolen, or the UE becomes non-functional, then the data synchronized from the UE 101 to the service provider 119 may be used as a back-up copy of the data for a new user device. Further, if the UE 101 is lost or stolen, the user may report to the service provider 119 about the lost or stolen status of the UE 101. Then, the service provider 119 sends a command to the UE 101 to place the UE 101 in a locked state. The communicator 205 may receive this command from the service provider 119 and place the UE 101 or its components in a locked state if the UE 101 is lost or stolen, wherein placing the UE 101 or its components in the locked state prevents access to the UE 101 or its components.

The data manager 207 manages the data at least according to their characteristics and other factors such as the type of access granted for interaction between the memory tags. The data manager 207 classifies the data based on these factors and selects an appropriate storage based on the classification. For example, the data manager 207 assigns high security data to a trusted storage of a high-level security, and low security data to a trusted storage of a low-level security. If the data does not need any security, the data manager 207 assigns the data to an untrusted storage. The data is then sent to the assigned (i.e. selected) storage via the communicator 205. Hence, the data manager 207 may also manage multiple trusted security storage areas as well as untrusted storage areas within the UE 101. In another example, the data manager 207 may manage multiple trusted storage areas within multiple user devices (e.g. UEs 101a-101n). The multiple user devices may be a family of devices, wherein some user devices (e.g., parent devices) have higher security management functionalities over other devices (e.g., child devices). The data managers from respective user devices may communicate one another to manage the multiple trusted storage areas within the multiple user devices. Further, in this example, the validators from the respective user devices may communicate with one another to perform various types of validation, authentication, approval and etc., to validate access to the multiple devices and/or the multiple storage areas.

Figure 3:
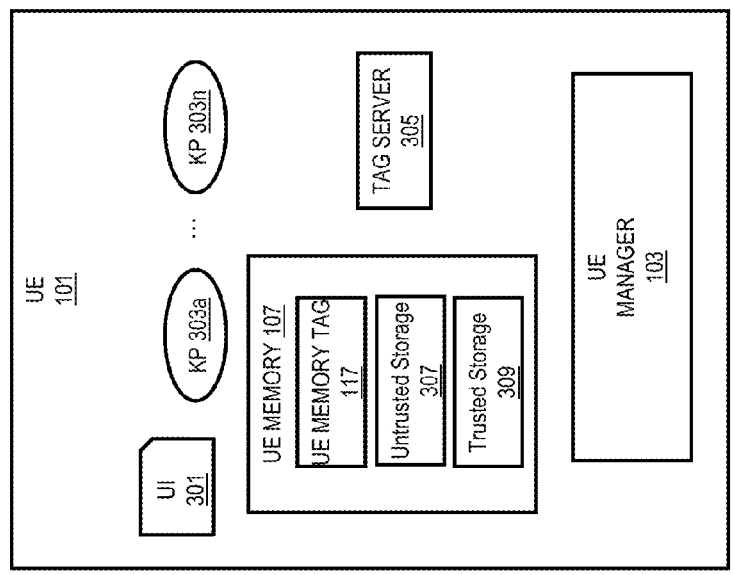
FIG. 3 is a diagram of the components of the user equipment, according to one embodiment.

FIG. 3 is a diagram of the components of the UE 101, according to one embodiment. The UE 101 includes a user interface 301 to provide a presentation that the user can use to interact with the UE 101. The UE 101 may also include the UE manager 103 to manage interactions such as data transfer between the UE 101 and the end device 109 as well as the service provider 119. The UE manager 103 also interacts with the UE 101 to manage the user input into the UE 101. The knowledge processors KP 303a-303n are components that process the user data with regards to an information space 109 that the UE 101 has connectivity to. A knowledge processor 303 may be located in various locations throughout the information space environment, including the UE 101.

In one embodiment, the UE memory tag 117 can be an internal component of the UE 101 (e.g., an embedded tag) or an external storage device and/or knowledge processor 309 connected to the UE 101. The tag server 305 manages the access to the UE memory tag 117 and operations such as reading, writing and organizing of information on the UE memory tag 117. Further, the UE 101 may include the untrusted storage 307 and the trusted storage 309. The untrusted storage 307 and the trusted storage 309 may be separate storage units or a single storage unit that has separate components for the untrusted section and the trusted section. The untrusted storage 307 and the trusted storage 309 may be internal components of the UE 101 or external storage devices connected to the UE 101.

Figure 4:
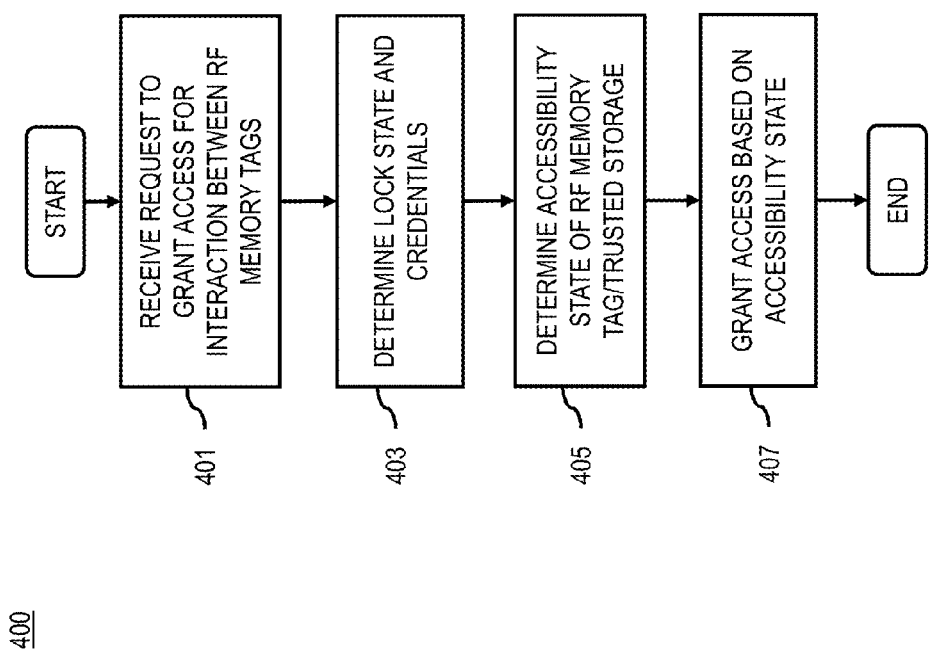
FIG. 4 is a flowchart of a process for transferring data via RF memory tags, according to one embodiment.
Figure 10:
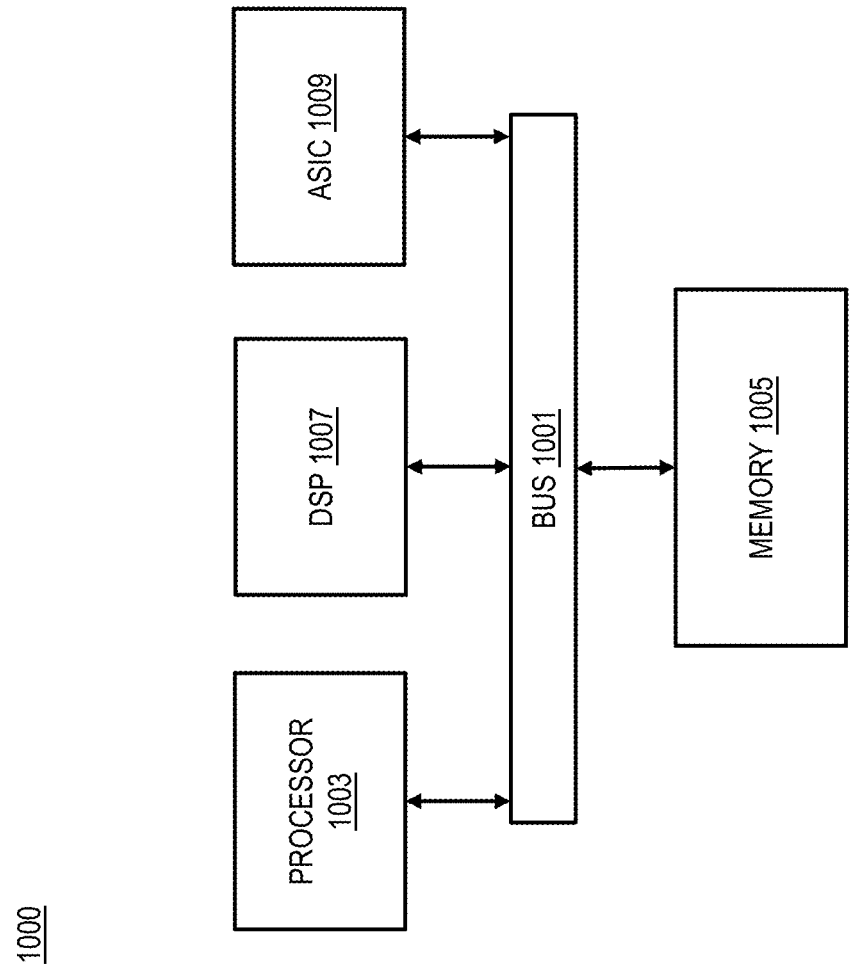
FIG. 10 is a diagram of a chip set that can be used to implement an embodiment of the invention.

FIG. 4 is a flowchart of a process for transferring data via RF memory tags, according to one embodiment. In one embodiment, the UE manager 103 performs the process 400 and is implemented in, for instance, a chip set including a processor and a memory as shown in FIG. 10. In step 401, the UE manager 103 receives a request to grant access for interaction between the RF memory tags (e.g. between the UE memory tag 117 and the end memory tag 113). The UE memory tag 117 may be associated with a trusted storage 309. The request may be made using a user interface at the UE 101. Then, the user may enter a command or press a button on the user interface to make a request. The request may also be made automatically. For example, the request may be made automatically when a certain conditions are satisfied. For short-range wireless devices, the conditions may include bringing the UE 101 close enough to the end device 109 such that the end device 109 is within the wireless range of the short-range wireless device in the UE 101. The request may include various types of information that is used to determine whether the access for interaction between the RF memory tags should be granted. For example, the request may include information related to the content or the data that is requested via the request, a target device to retrieve the requested content (e.g. the end device 109), authentication information such as a user id and a password, any other specific commands such as read from the end device 109 or write to the end device 109, a method of transfer, a type of transactions between the devices, a method for transactions, and etc. Some or all of this information may be provided using the user interface.

In step 403, the UE manager 103 determines the lock state of the UE 101 and the credentials to access the components of the UE 101 and/or the end device 109. If the UE 101 is locked (in a locked state), then the accessibility to the UE 101 or its components (e.g. the UE memory tag, trusted storage, etc.) may be blocked or limited. The UE 101 or its components may be placed in a locked state if the UE 101 or its components are lost or stolen. If the UE 101 or its components are stolen, the user/owner of the UE 101 or its components may report the lost or stolen status to a service provider 119. Then, the service provider will connect to the UE 101 and place the UE 101 in a locked state. This feature is advantageous in that it protects the information in the UE 101 and its components from another person that the user does not want to provide access. Further, in one embodiment, the content in the UE 101 may be synchronized with the service provider 119 or another device, periodically or at a user's request. Thus, the content in the UE 101 may be copied or transferred to the service provider 119 or another device. When the UE 101 is lost or stolen, or becomes non-functional (e.g. broken), the user can acquire another device, connect the device to the service provider 119 to acquire the content that has been stored in the service provider 119 via synchronization with the previous device that is lost or stolen or non-functional. This feature is advantageous in that the synchronization backs-up another copy of the content. Also, if the credentials to access the UE 101 are not successfully validated, then the accessibility to the UE 101 may also be prevented or limited. The credentials may be in a form of a user id and a password. Further, the credentials may be for the UE 101 and/or there may be separate credential information for each of the components of the UE 101. Further, other credentials to access the end device 109 may need to be entered to access the end device 109 and its components.

In step 405, the accessibility state of the UE memory tag 117, the trusted storage 309 or a combination thereof is determined. The accessibility state may be determined based on various factors, including the information entered in the request. The accessibility state may also be determined based on additional limitations. The limitations may include the time limit of the access (i.e. how long the UE 101 can be connected to another device), the type of the target device, type of the target content, the type of connection (e.g. fast v. slow connection), the device capabilities and etc. Then, in step 407, the access for interaction between the UE memory tag 117 and the end memory tag 113 is granted based on the accessibility state. In one embodiment, the access may be recorded and stored in any of the storage locations (e.g. RF memory tags, trusted storage, service provider, etc.). The access may be recorded such that the history of the access and transfer of information between the RF memory tags may be recorded and maintained.

The access may relate to various types of transfer of information and transactions, including financial transactions, financial information transfer, transfer of medical information or other personal information, transfer of privileged information or a combination thereof. In one example, the UE 101 may include a digital wallet (not shown) including or having connectivity to the components of the UE 101, including the UI 301, the UE memory 107, the tag server 305, the UE manager 103 and other components of the UE 101. The digital wallet may include financial information as well as other types of information. When financial transactions take place via the access, then the digital wallet within the UE 101 may include the amount of digital cash or points that the user has, while the end device 109 may be a device at a store. As the user attempts to purchase items from the store, the UE 101 establishes connection with the end device 109 at the store, as the access is granted. If the user purchases the items, the amount of digital cash or points within the digital wallet in the UE 101 is adjusted according to the purchase, by writing content from the end device 109 to the digital wallet in the UE 101.

The digital wallet may also contain consent information, wherein the consent given from the UE 101 to another device enables exchange of information from the UE 101 and the other device and/or from the other device to the UE 101. This feature may be used in a doctor-patient setting, for example. As consent is given, exchange of information including consent information as well as other medical information (e.g. medical records, healthcare actions and treatments, doctors who performed the treatments, hospital locations, medical insurance information and other medical data) may be performed. In this example, if the consent information in the digital wallet shows that the patient has given the consent to the doctor, then the doctor may read and write on the trusted storage 309 of the patient's UE 101. The scope of the access may be based on the consent information, wherein the scope may include a time, a location, a duration, a party, a role of the party, an activity, a record, or a combination thereof. As the user of the UE 101 gives the consent, the user may provide the end memory tag 113 of the end memory tag 113 of the end device 109 of the doctor with medical information with the past medical history. The consent may be given from the user to a specific doctor or to an organization (e.g. hospital) having one or more doctors. If the consent is given to an organization, then the doctors within the organization may share all of some of the consent. Further, as the consent is given to the doctor's device, an appointment with the doctor may be arranged. The status of the consent is updated as the consent is given to the end memory tag 113, and is stored in the trusted storage 309.

Further, after the user of the UE 101 gives the consent and the doctor updates the user's medical information (e.g. after seeing the user), the updated medical information about the user stored in the end memory tag 113 of the end device 109 of the doctor may be retrieved to the UE memory tag 117. The personal information retrieved from the doctor's end device 109 may include prescription of medicine, which may be stored in a trusted storage 309 of the UE 101 and be presented to a pharmacist, in order to obtain drugs corresponding to the prescription. When the prescription of the medicine is passed from the doctor's end device 109 to the patient's device (e.g., UE 101), the identity and/or the doctor's license information and other information about the doctor may be transferred to the UE 101. The prescription may be stored in the UE 101 in encrypted format such that a patient or other users using the UE 101 cannot access the prescription data and possibly temper with the prescription. In this example, the prescription data may still be deleted or transferred to a doctor's end device 109 or a pharmacist's device, and only authorized users (e.g. doctors or pharmacists) or devices may be able to decrypt and access the encrypted prescription data. One advantage of this feature is that the prescription being transferred from the doctor's end device 109 to the UE 101 is difficult to counterfeit, and thus prevents fraudulent prescription of drugs. Another advantage of this feature is that the record of these accesses and transactions may be maintained for a future reference and review. In one example, if the package containing medicine is equipped with a memory tag, the route or the chain of the medicine package may be tracked and the origin of the package may be verified. Further, if there is a thermometer associated with the memory tag in the package, then the temperature may be constantly stored at the memory tag, and the temperature during the delivery of the package may be kept in a record, in order to verify that the package has been delivered in a proper temperature condition.

In one embodiment, the consent may be given from the UE 101 to the end device 109 by using the UE 101 to touch or tap the end device 109. This touching or tapping is sensed by the end device 109, and the consent is approved based on the device and personal information exchanged between the UE 101 and the end device 109. Further, the consent may have conditions that invalidate the consent such as a time limit, wherein the consent becomes invalid upon expiration of the time limit. The consent may be renewed by communicating with a corresponding device again (e.g. by the touching or the tapping). Further, there may be different types of consent, wherein separate approvals are requested for each type of consent. For example, a doctor performing a gastric bypass surgery would only obtain consent for medical information related to the gastric bypass surgery.

In one embodiment, the request may involve a third memory tag (not shown), which may be a RF memory tag, and granting of the access may relate to the UE memory tag 117 and the end memory tag 113, the third memory tag, or a combination thereof. For example, a digital token may be transferred from the end memory tag 113 to the UE memory tag 117 after the UE 101 pays for the digital token using the digital wallet in the UE 101 via the access. Then, the digital token may be transferred from the UE 101 to the third memory tag, either temporarily or permanently. When the digital token is transferred from the UE 101 to the third memory tag, the digital token in the digital wallet of the UE 101 may be deleted or disabled permanently or temporarily. In another example, a parental consent for digital media may involve the parent's device and the child's device. The parent consent may be transferred from the end device 109 or the service provider 119 to the parent's device, and the parent may allow transfer of the parent consent to the child's device, in order to give the parental consent to the child. This transfer may also include transfer of money from one device to another, instead of the parental consent.

The UE 101 may disable or restrict the use of the digital wallet and/or the trusted storage 309 for certain situations where the security may be a concern. For example, if the end memory tag 113 is in an end device 109 in a public space that is open to public, the content from the end memory tag 113 may not be considered secure, at least due to the nature of the device open to public. In one example, in a public memory tag that contains bus station information, the UE 101 may allow only reading from the public memory tag by the UE 101, and disable writing. Alternatively, the UE 101 may disable the digital wallet, thereby disabling any features that relate to secured transfer of information, such as accessing of the trusted storage 309.

This process shown in FIG. 4 is advantageous in that it provides security in transfer of information between the RF memory tags by granting access for interaction between the RF memory tags based on the accessibility state. In particular, the accessibility state is determined based on the lock state, wherein the device is placed in a locked state if it's stolen or lost. Further, the accessibility state is based on the credentials, and thus providing additional security. Thus, this process prevents any unwanted transfer of data between the RF memory tags. The UE manager is a means for achieving these advantages.

Figure 5:
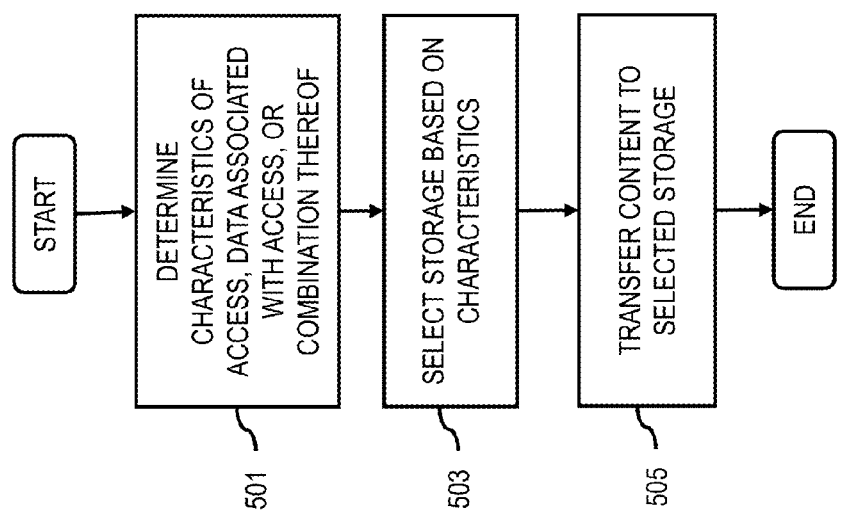
FIG. 5 is a flowchart of a process for selecting a storage based on characteristics of access and/or data, according to one embodiment.

FIG. 5 is a flowchart of a process for selecting a storage based on characteristics of access and/or data, according to one embodiment. In one embodiment, the UE manager 103 performs the process 500 and is implemented in, for instance, a chip set including a processor and a memory as shown in FIG. 10. The process 500 may occur during or after the process 400. In step 501, the UE manager 103 determines characteristics of access, data associated with access, or a combination thereof, wherein the access is the access for interaction between the UE memory tag 117 and the end device memory tag 113. The characteristics of access may include the type of access as well as purpose of access. The type of access may be a read access, a write access, synchronization, deletion, copying and etc. The purpose of access may include various transactions to be performed, such as making payments, submitting a bus ticket, giving a consent, exchange of items and etc. The characteristics of data associated with the access may also include information about these various transactions. The characteristics of the data may also include the type of data as well as the content of the data. In step 503, the UE manager 103 selects a storage location based on the characteristics of access, data associated with access, or a combination thereof.

If the process 500 happens during the process 400, the access may be granted after step 503, wherein the access may be based on the selected storage location. The selected storage location may be a trusted storage 309, selected from storages of different security levels. For example, the trust storage 309 may include a general trusted storage and a certified storage. The general trusted storage is for the type of data that needs low level of security. Thus, if the characteristics of the data associated with the access show the low security level, then the general trusted storage is selected, as the storage to transfer the data associated with the access. In the general trusted storage. Similarly, if the characteristics of the data associated with the access shows the high security level, then the certified storage is selected. The type of data for high security level may include data that do not require high-level certification or security protection, such as credit card information, debit card information, transportation tickets, confidential agreements, doctor-patient consents, etc., and some information in the certified storage may carry a certain expiration date. The type of data for low security level may include data that needs some security, but not as high as the high security level data, and thus may include e-mails, text messages, contacts, bookmarks, and etc. Further, the selected storage location may be the untrusted storage 307. The untrusted storage 307 is for data that need no security or protection and may be open to public. Advertisements or public announcements and etc. may be directed to the untrusted storage 307. Then, as shown in step 505, the data content is transferred to the selected storage.

In one embodiment, the data stored in the trusted storage 309 may be checked to determine the trust level of the trusted storage 309. For example, both the general trusted storage and the certified storage may be checked. There may be parameters that determine the trust level of each data. For example, if the data is virus scanned, this contributes to higher trust level, whereas the data having signs of malware or suspicious activity may contribute to a lower trust level. Thus, if the storage contains a lot of data with high trust level, the trust level of the storage will be high. Further, the UE manager 103 may purge the general trusted storage if the storage level decreases to a lower than the low threshold level of security. For the certified storage, if the security level of the certified storage is not above a certain threshold level of security for the certified storage, the certified storage may not qualify to perform high-security transactions such as credit card transactions or other transfer of high-security information. This is to protect any unsecured transactions that are vulnerable to any outside intervention or hacking Generally, the certified storage should have a higher trust level than the general trusted storage, partly because the data stored in the certified storage is pre-screened for high certification or security level. In another example, if there are multiple general trusted storages with different security levels, the retrieved content may be assigned to the corresponding storage based on the estimated security level of the data.

In one embodiment, the data content may be transferred from the end memory tag 107 to the UE memory tag 117, and then transferred to an untrusted storage 307 associated with the UE memory tag 117. Then, the data transferred to the untrusted storage 307 may be transferred to the trusted storage 309, if the access for interaction between the end memory tag 107 to the UE memory tag 117 is granted. In one example, the data to update the amount of money in the digital wallet within the UE 101 may be transferred from the end memory tag 107 to the UE memory tag 117, and then transferred to an untrusted storage 307 associated with the UE memory tag 117. Then, this data is transferred to the trusted storage 309 associated with the digital wallet to update the amount of money in the digital wallet, if the access for interaction between the end memory tag 107 to the UE memory tag 117 is granted.

This process is advantageous in that it provides a way to select a storage based on the characteristics of access or data such that a proper storage is used for a corresponding data. For example, this feature increases security measures in protecting high-security data by placing such data in one storage, while placing low-security data in another storage. The UE manager 103 is a means for achieving this advantage.

Figure 6:
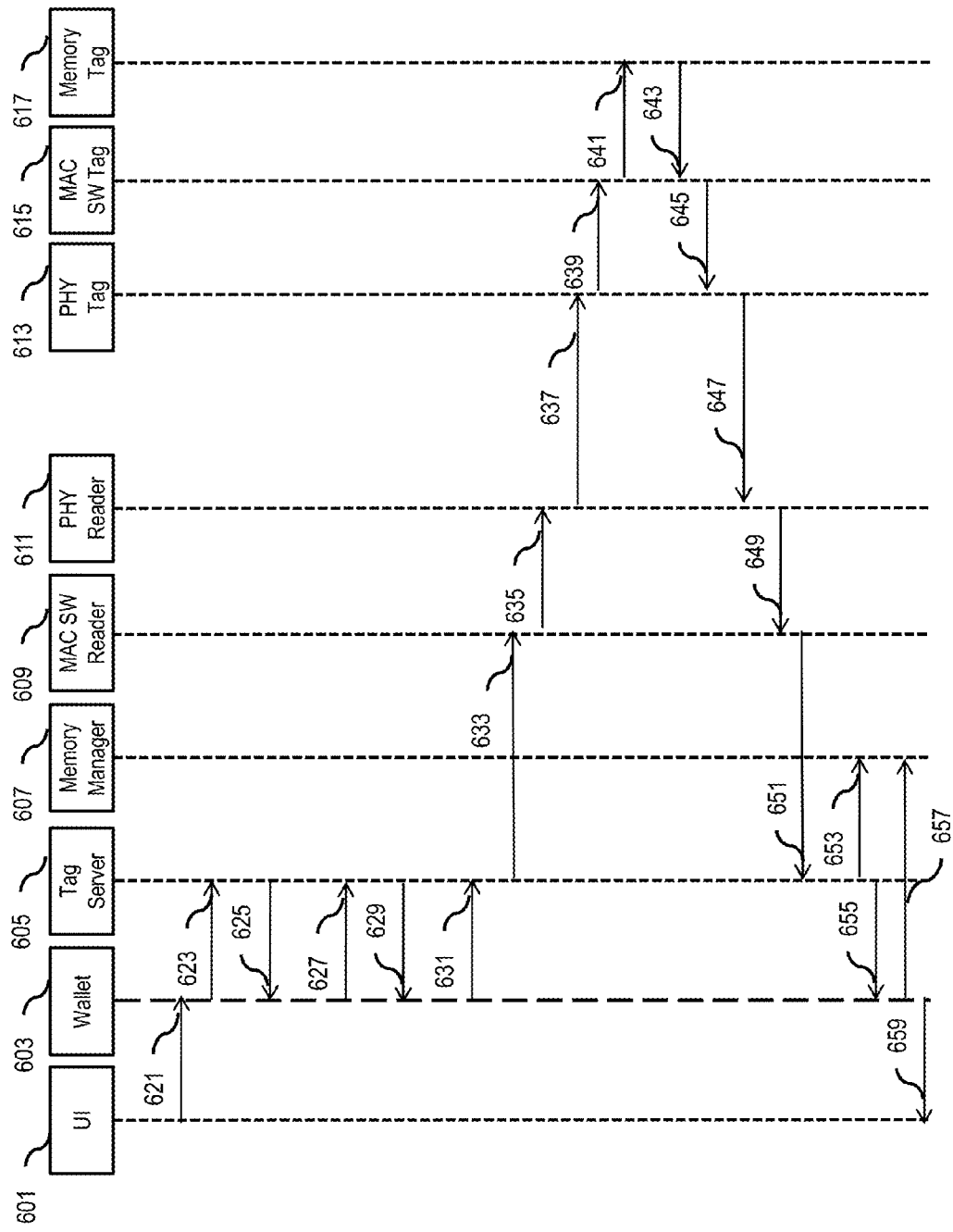
FIG. 6 is a time sequence diagram that illustrates sequences of messages and processes of use cases scenarios for transferring data via RF memory tags, according to one embodiment.

FIG. 6 is a time sequence diagram that illustrates sequences of processes of use cases scenarios for transferring data via RF memory tags, according to one embodiment. A device process per device is represented by a vertical line. Communication passed from one device process to another is represented by horizontal arrows, and the horizontal arrows are labeled with numbers that represent steps.

The processes represented in FIG. 6 are the UI (user interface) 601, the digital wallet 603, the tag server 605, the memory manager 607, the MAC (media access control) SW (software) reader 609 and the PHY (physical) reader 611, the PHY tag 613, the MAC SW tag 615 and the memory tag 617, which may be a RF memory tag. For example, the components on the left side, including the UI 601, the digital wallet 603, the tag server 605, the memory manager 607, the MAC SW reader 609 and the PHY reader 611, may be included within the UE 101 or may be externally connected to the UE 101 (e.g., connected via an external dongle device). Further, for example, the components on the right side, including the PHY tag 613, the MAC SW tag 615 and the memory tag 617, may be included within the end device 109. The UI 601 may be an example of the UI 301 shown in FIG. 3, and the tag server 605 may be an example of the tag server 305. The memory tag 617 may be an example of the end memory tag 113. The UI 601 may be used to receive a request (e.g. from a user) to grant access form interaction between the memory tag (not shown) of the UE 101 and the memory tag 617 of the end device 109. As shown in step 621, a content request is made at the UI 601 and is sent to the wallet 603. For example, a user may type in a command or press a button on the UI 601 to submit the request. The content request may include information such as a type of content, name of the content, a target device, specific command such as read from the end device 109 or write to the end device 109, specified data to seek to transfer, as well as authentication information such as a user id and a password.

When the wallet 603 receives the content request, then the wallet 603 sends an accessibility request to the tag server 605, as shown in step 623. The accessibility request may include information about the type or the name of the content specified in the content request, and any information related checking whether the UE 101 is locked, and thus the content within the UE 101 cannot be accessed. As previously discussed, in one example, the UE 101 may be locked automatically if there is an indication that the UE 101 is lost or stolen. Then, the tag server 605 sends the accessibility response to the wallet 603 with an indication as to whether the UE 101 is locked, as shown in step 625. If there is an indication that the UE 101 is not locked, the UE 101 is not locked for the type or the name of the content specified in the content request, and a connection with the end device 109 is established. Further, the wallet 603 also places the content in a corresponding category for security. For example, the categories for security may include different security levels (or trust levels), such as device, untrusted storage 307, and trusted storage 309. Then, the wallet 603 sends a validated content request to the tag server 605, as shown in step 627. The validated content request may include information such as trust level, locality, ownership, authentication information, indication that the UE 101 is not locked, information as to whether to read or write, and the name of the content. The validated content request may be then sent from the tag server 605 to the end device 109 to approve the validation. Once the validated content request is validated, the tag server 605 receives the approval, and then the validated content response is sent to the wallet. Also, with the approval, the wallet 603 sends a content retrieval command to the tag server 605, as shown in step 631. In another embodiment, the validated content request may be automatically made at the wallet 603, without a user submitting the content request via step 621. In this embodiment, the validated content request may be automatically made depending on conditions, such as a user settings or security settings to make the content request automatic. Thus, in this embodiment, the steps 621, 623 and 625 may be skipped.

The tag server 605 then contacts the MAC SW Reader 609 (step 633), which then translates the software command from the tag server 605 to an electrical signal. The tag server 605 may also inform the memory manager 607 of the software command from the tag server 506. This electrical signal is sent to the PHY Reader 611 (step 635), which is then transmitted to the PHY tag 613 at the end device 109, to request retrieval of the requested content (step 637). This signal is then sent to the MAC SW tag 615 (step 639) and is converted to a software command, which is then sent to the memory tag 617 at the end device 109 to retrieve the requested content (step 641). The requested content is then retrieved based on the information provided in the request, and the requested content is sent to the MAC SW Tag 615, as shown in step 643. MAC SW Tag 615 converts the requested content to an electrical signal, and then sends it to the PHY tag 613, as shown in step 645. This electrical signal containing the requested content is then retrieved by the PHY reader 611 from the PHY tag 613, as shown in step 647. This retrieved electrical signal containing the requested content is then sent to the MAC SW reader 609 to convert the electrical signal into a software format of the requested content (step 649). The software format of the requested content is then sent to the tag server 605, as shown in step 651. Then, the tag server 605 sends a command to the memory manager 607 to write the requested content to the memory tag of the UE 101 (step 653). In step 655, the tag server 605 may provide the wallet 603 with information about the requested content. Then, the wallet 603 checks and verifies the content that is being written, to determine the location of the memory where the content is to be written, depending on various conditions. For example, the content written in the memory tag of the UE 101 may be transferred to the trusted storage 309 or the untrusted storage area 307 within the UE 101, depending on the determined location where the content is to be written. The conditions may include where the write action is originated from. If the write action is originated from another end point, then the content may be untrusted by default before verification by the wallet 603. Further, if there is a sign that the user is aware of the requested content and its trust level (e.g., user initiating the request to acquire the content), then the wallet 603 may determine that the requested content may be stored in a trusted storage area 309. The conditions may include the location of the powering of the memory tag. For example, if the powering of the memory tag from the same end point (inside the device), the requested content may be considered more trusted than the case where the powering is from another end point (outside the device). The tag server 605 may also send a notification about the retrieval of the requested content to the wallet 603 (step 655) and the wallet 603 may forward this notification to the UI 601 (step 659) such that the UI 601 can present the result of the retrieval.

FIG. 7 is an example diagram 700 showing various components of the UE 101 and their functionalities, according to one embodiment. The UI 701 may include the management interface 707 to manage various components of the user interface. The examples of the components for the user interface are Nokia UI 709, Bank/Operator UIs 711 and trusted UI library 713. The Nokia UI 709 may include a user interface enabling the user of the UE 101 to interact with a Nokia server, which is an example of a service provider. Bank/Operator UIs 711 enables the user to interact with a banking server or a credit card server, so as to set up payments to be made for purchases. The trusted UI library 713 may include a collection of trusted user interfaces that may be retrieved from the library to the user interface, so that the user may use the retrieved user interfaces for the UE 101. One example of the trusted UI library a version of Qt, developed by Nokia, that is used to develop graphical user interface programs.

The digital wallet 703 may include the trusted storage having the certified storage 715 and the general trusted storage 719. The certified storage 715 includes secure information such as information regarding credit card, debit card, prepaid value, and transportation ticket (e.g. a bus pass). The general trusted storage 719 may include secure information that does not require a security level as high as the certified storage. Thus, for example, the trusted storage 719 may include e-mails, short message service (SMS) data, contacts, bookmarks and etc. Further, although not shown, the UE 101 may also have an untrusted storage 307 to store unsecure information. The digital wallet may also include a secure hardware abstraction layer 723 that may be used to communicate between a hardware portion of the UE 101 and the software portion of the UE 101. The wallet 703 may communicate with the tag server 705 and other memory units to read/write data. The tag server 705 communicates with a memory tag such as the eTag 725, to enable communication between the memory tag of the UE 101 and another memory tag. The eTag 725 may have set memory allocations 727. The data transferred to the eTag 725 via the tag server 705 may be written in other storage locations such as the ARM (Advanced RISC Machine) memory, SIM (subscriber identity module) memory and USD (universal storage device) memory. Further, BB5 (Base Band 5, by Nokia) may be implemented to lock or unlock the UE 101. The UE 101 may also include an on-board credentials (ObC) 737 to verify any authentication information provided to the UE 101.

Figure 8B:
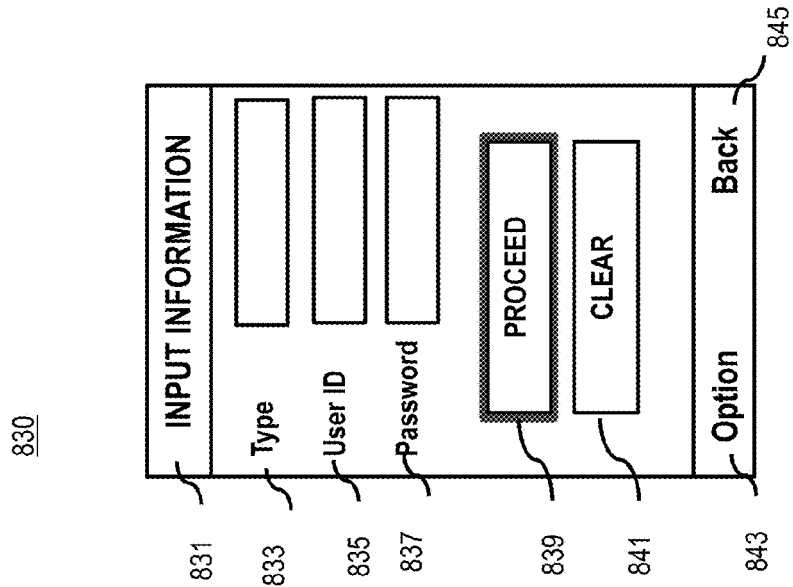
FIGS. 8A-8D are diagrams of user interfaces utilized in the processes of FIG. 4, according to various embodiments.
Figure 8A:
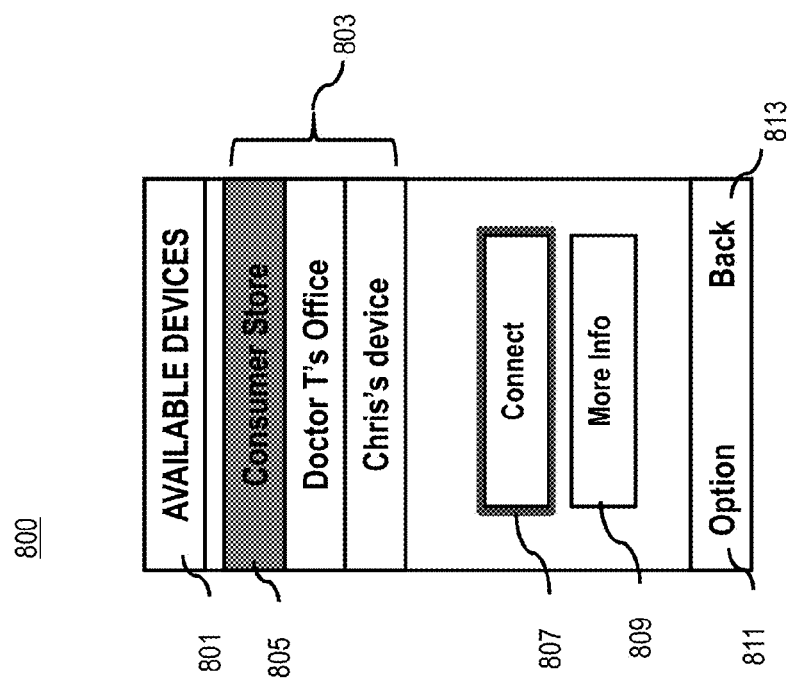

FIGS. 8A-8D are diagrams of user interfaces utilized in the processes of FIG. 3, according to various embodiments. FIG. 8A shows a user interface 800 of the UE 101 showing available devices that the UE 101 can connect. The title 801 shows "available devices," as the user interface is for selecting a device from a list of available devices 803. In this example, the list 803 shows that there are three available devices: a consumer store's device, Doctor T's Office's device, and Chris's device. In this example, the consumer store's device is selected, as highlighted 805. The "connect" button 807 may be selected to connect to the highlighted device. The "More Info" button 809 may be selected to show additional information about the highlighted device. The Option 811 may be selected to display any other options that a user may choose on the UE 101. The Back button 813 may be selected to go back to a previous user interface or a previous screen.

FIG. 8B shows a user interface 830 of the UE 101 showing slots to enter various inputs. The title 831 shows "input information," in order to show that the user interface is for entering information. The type slot 833 is a slot to enter a type of content or a name of content that is to be transferred between the UE 101 and the end device 109. The user id slot 835 is a slot to enter a user id and the password slot 837 is the slot to enter a password, wherein the user id and the password may be a part of authentication information. The proceed button 839 may be used to proceed with the entered information, and the clear button 841 may be used to clear the slots from previous entries. The Option 844 and the Back button 845 have similar functionalities as the Option 811 and the Back button 813.

Figure 8D:
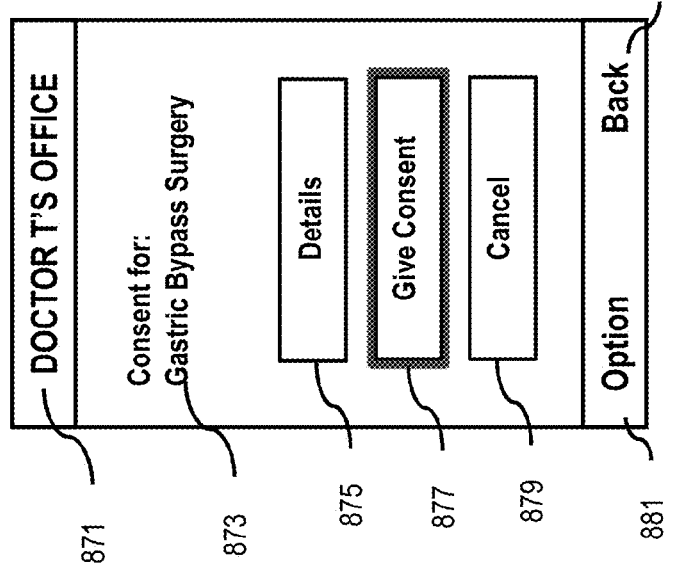
Figure 8C:
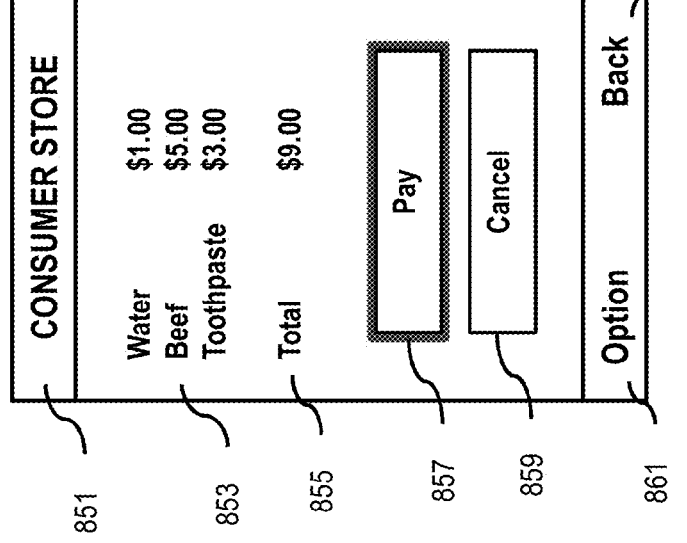

FIG. 8C shows a user interface 850 showing transactions to be made in a consumer store, when connected with a device in the consumer store. When the authentication information entered in FIG. 8B is validated, then the consumer store's device may be allowed to have the read/write access to the UE memory 107. In this example, with the read/write access to the UE memory 107, a digital wallet in the UE 101 may be used to pay for the total cost 855 for purchasing the items 853. If the pay button 857 is selected, then the content related to this transaction is transferred from the end device 109 to the UE 101 and is written in the memory in the UE 101, to accomplish payments by the digital wallet in the UE 101. The payments by the digital wallet in the UE 101 may be made incrementally (e.g. via payment in parts). The payments may be made in parts over a period of time. In addition, the payments may be made in parts by multiple digital wallets within a single device or multiple devices. Further the payments may be made in parts in such a way that a portion of the payment for a smaller or a limited version of the content may be made first and then the smaller or limited version of the content may be upgraded to a full version of the content by additional payment. Then, the amount of money remaining in the digital wallet may be updated according to the purchase. Although not shown, the user interface may offer different payment options, such as a credit card, e-check, bill request, and etc. If the bill request is selected as a payment option, then an address to send the bill is verified in the user interface. If the user does not wish to make the purchase, the cancel button 859 may be selected. The Option 861 and the Back button 863 have similar functionalities as the Option 811 and the Back button 813.

FIG. 8D shows a user interface 850 showing transactions to be made in Doctor T's Office, when connected with a device in the Doctor T's Office. The user of the UE 101 may be a patient visiting Doctor T's Office. Then, the patient may need to give patient's consent to the doctor to allow the doctor to perform a procedure. The consent window 873 shows the type of consent, which is a consent for gastric bypass surgery, in this example. The details button 875 may be selected to display further details on the consent and the procedure. The give consent button 877 may be selected to give consent to the doctor or an organization where the doctor works. The cancel button 879 may be selected to cancel the transaction involving the patient consent. The Option 881 and the Back button 883 have similar functionalities as the Option 811 and the Back button 813. Instead of or in addition to the consent button 877, the consent may be given in a form of a token, where the token is given from the patient to the doctor when the patient's device makes a physical contact with the doctor's device. The consent may have parameters that affect the scope of the doctor's access of the patient's device UE 101. For example, the consent may have parameters for business to consumer, which may assign a treating <doctor> who obtains consent, for <time period x>, for <area y>. In this example, the parameters are <doctor> for the name of the doctor, <time period x> for the period of time where the consent is valid, and <area y> for the area in which the consent is valid. The consent may also have parameters for business to consumer, which may assign consent for <doctor z> working in <organization O>, for <time period P>, with <extent E> and assigned <role R> for <patient X>. In this example, the parameters include <doctor z> for the name of the doctor, <organization O> for the name of the organization that the doctor z belongs, <time period P> for the period of time where the consent is valid, <extent E> for the extent the consent is valid, <role R> for the doctor z's role within the consent, and <patient X> for the patient's name who gives the consent. The arrangement of these parameters are not limited to the examples shown above, and may be arranged in various patterns.

The processes described herein for transferring data via RF memory tags may be advantageously implemented via software, hardware, firmware or a combination of software and/or firmware and/or hardware. For example, the processes described herein, including for providing user interface navigation information associated with the availability of services, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 9:
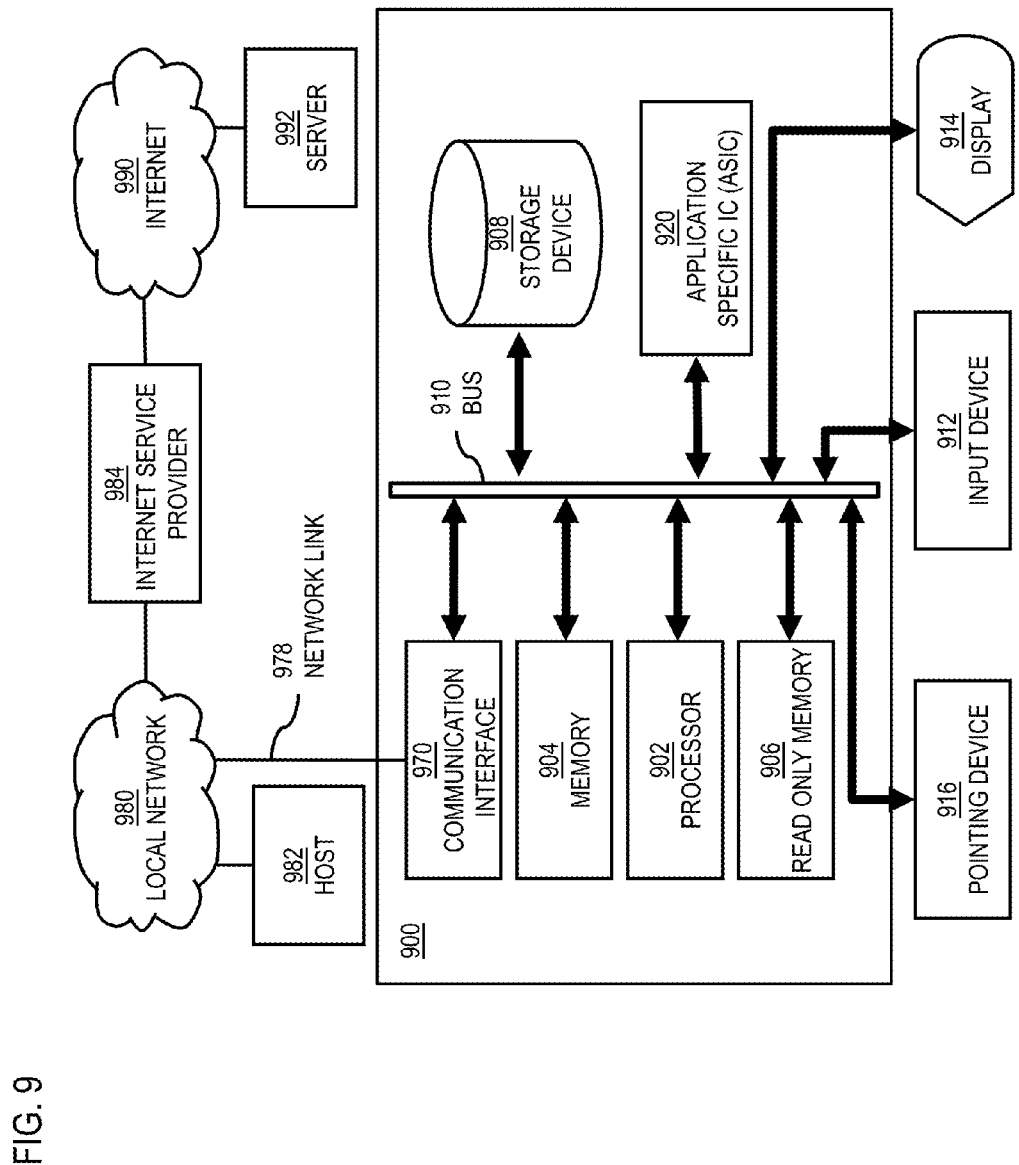
FIG. 9 is a diagram of hardware that can be used to implement an embodiment of the invention.

FIG. 9 illustrates a computer system 900 upon which an embodiment of the invention may be implemented. Although computer system 900 is depicted with respect to a particular device or equipment, it is contemplated that other devices or equipment (e.g., network elements, servers, etc.) within FIG. 9 can deploy the illustrated hardware and components of system 900. Computer system 900 is programmed (e.g., via computer program code or instructions) to transfer data via RF memory tags as described herein and includes a communication mechanism such as a bus 910 for passing information between other internal and external components of the computer system 900. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 900, or a portion thereof, constitutes a means for performing one or more steps of transferring data via RF memory tags.

A bus 910 includes one or more parallel conductors of information so that information is transferred quickly among devices coupled to the bus 910. One or more processors 902 for processing information are coupled with the bus 910.

A processor (or multiple processors) 902 performs a set of operations on information as specified by computer program code related to transferring data via RF memory tags. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 910 and placing information on the bus 910. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 902, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 900 also includes a memory 904 coupled to bus 910. The memory 904, such as a random access memory (RAM) or other dynamic storage device, stores information including processor instructions for transferring data via RF memory tags. Dynamic memory allows information stored therein to be changed by the computer system 900. RAM allows a unit of information stored at a location called a memory address to be stored and retrieved independently of information at neighboring addresses. The memory 904 is also used by the processor 902 to store temporary values during execution of processor instructions. The computer system 900 also includes a read only memory (ROM) 906 or other static storage device coupled to the bus 910 for storing static information, including instructions, that is not changed by the computer system 900. Some memory is composed of volatile storage that loses the information stored thereon when power is lost. Also coupled to bus 910 is a non-volatile (persistent) storage device 908, such as a magnetic disk, optical disk or flash card, for storing information, including instructions, that persists even when the computer system 900 is turned off or otherwise loses power.

Information, including instructions for transferring data via RF memory tags, is provided to the bus 910 for use by the processor from an external input device 912, such as a keyboard containing alphanumeric keys operated by a human user, or a sensor. A sensor detects conditions in its vicinity and transforms those detections into physical expression compatible with the measurable phenomenon used to represent information in computer system 900. Other external devices coupled to bus 910, used primarily for interacting with humans, include a display device 914, such as a cathode ray tube (CRT) or a liquid crystal display (LCD), or plasma screen or printer for presenting text or images, and a pointing device 916, such as a mouse or a trackball or cursor direction keys, or motion sensor, for controlling a position of a small cursor image presented on the display 914 and issuing commands associated with graphical elements presented on the display 914. In some embodiments, for example, in embodiments in which the computer system 900 performs all functions automatically without human input, one or more of external input device 912, display device 914 and pointing device 916 is omitted.

In the illustrated embodiment, special purpose hardware, such as an application specific integrated circuit (ASIC) 920, is coupled to bus 910. The special purpose hardware is configured to perform operations not performed by processor 902 quickly enough for special purposes. Examples of application specific ICs include graphics accelerator cards for generating images for display 914, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 900 also includes one or more instances of a communications interface 970 coupled to bus 910. Communication interface 970 provides a one-way or two-way communication coupling to a variety of external devices that operate with their own processors, such as printers, scanners and external disks. In general the coupling is with a network link 978 that is connected to a local network 980 to which a variety of external devices with their own processors are connected. For example, communication interface 970 may be a parallel port or a serial port or a universal serial bus (USB) port on a personal computer. In some embodiments, communications interface 970 is an integrated services digital network (ISDN) card or a digital subscriber line (DSL) card or a telephone modem that provides an information communication connection to a corresponding type of telephone line. In some embodiments, a communication interface 970 is a cable modem that converts signals on bus 910 into signals for a communication connection over a coaxial cable or into optical signals for a communication connection over a fiber optic cable. As another example, communications interface 970 may be a local area network (LAN) card to provide a data communication connection to a compatible LAN, such as Ethernet. Wireless links may also be implemented. For wireless links, the communications interface 970 sends or receives or both sends and receives electrical, acoustic or electromagnetic signals, including infrared and optical signals, that carry information streams, such as digital data. For example, in wireless handheld devices, such as mobile telephones like cell phones, the communications interface 970 includes a radio band electromagnetic transmitter and receiver called a radio transceiver. In certain embodiments, the communications interface 970 enables connection to the communication network 105 for transferring data via RF memory tags.

The term "computer-readable medium" as used herein refers to any medium that participates in providing information to processor 902, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 908. Volatile media include, for example, dynamic memory 904. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 920.

Network link 978 typically provides information communication using transmission media through one or more networks to other devices that use or process the information. For example, network link 978 may provide a connection through local network 980 to a host computer 982 or to equipment 984 operated by an Internet Service Provider (ISP). ISP equipment 984 in turn provides data communication services through the public, world-wide packet-switching communication network of networks now commonly referred to as the Internet 990.

A computer called a server host 992 connected to the Internet hosts a process that provides a service in response to information received over the Internet. For example, server host 992 hosts a process that provides information representing video data for presentation at display 914. It is contemplated that the components of system 900 can be deployed in various configurations within other computer systems, e.g., host 982 and server 992.

At least some embodiments of the invention are related to the use of computer system 900 for implementing some or all of the techniques described herein. According to one embodiment of the invention, those techniques are performed by computer system 900 in response to processor 902 executing one or more sequences of one or more processor instructions contained in memory 904. Such instructions, also called computer instructions, software and program code, may be read into memory 904 from another computer-readable medium such as storage device 908 or network link 978. Execution of the sequences of instructions contained in memory 904 causes processor 902 to perform one or more of the method steps described herein. In alternative embodiments, hardware, such as ASIC 920, may be used in place of or in combination with software to implement the invention. Thus, embodiments of the invention are not limited to any specific combination of hardware and software, unless otherwise explicitly stated herein.

The signals transmitted over network link 978 and other networks through communications interface 970, carry information to and from computer system 900. Computer system 900 can send and receive information, including program code, through the networks 980, 990 among others, through network link 978 and communications interface 970. In an example using the Internet 990, a server host 992 transmits program code for a particular application, requested by a message sent from computer 900, through Internet 990, ISP equipment 984, local network 980 and communications interface 970. The received code may be executed by processor 902 as it is received, or may be stored in memory 904 or in storage device 908 or other non-volatile storage for later execution, or both. In this manner, computer system 900 may obtain application program code in the form of signals on a carrier wave.

Various forms of computer readable media may be involved in carrying one or more sequence of instructions or data or both to processor 902 for execution. For example, instructions and data may initially be carried on a magnetic disk of a remote computer such as host 982. The remote computer loads the instructions and data into its dynamic memory and sends the instructions and data over a telephone line using a modem. A modem local to the computer system 900 receives the instructions and data on a telephone line and uses an infra-red transmitter to convert the instructions and data to a signal on an infra-red carrier wave serving as the network link 978. An infrared detector serving as communications interface 970 receives the instructions and data carried in the infrared signal and places information representing the instructions and data onto bus 910. Bus 910 carries the information to memory 904 from which processor 902 retrieves and executes the instructions using some of the data sent with the instructions. The instructions and data received in memory 904 may optionally be stored on storage device 908, either before or after execution by the processor 902.

FIG. 10 illustrates a chip set or chip 1000 upon which an embodiment of the invention may be implemented. Chip set 1000 is programmed to transfer data via RF memory tags as described herein and includes, for instance, the processor and memory components described with respect to FIG. 9 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of providing user interface navigation information associated with the availability of services. Chip set or chip 1000, or a portion thereof, constitutes a means for performing one or more steps of transferring data via RF memory tags.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1000 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to transfer data via RF memory tags. The memory 1005 also stores the data associated with or generated by the execution of the inventive steps.

Figure 11:
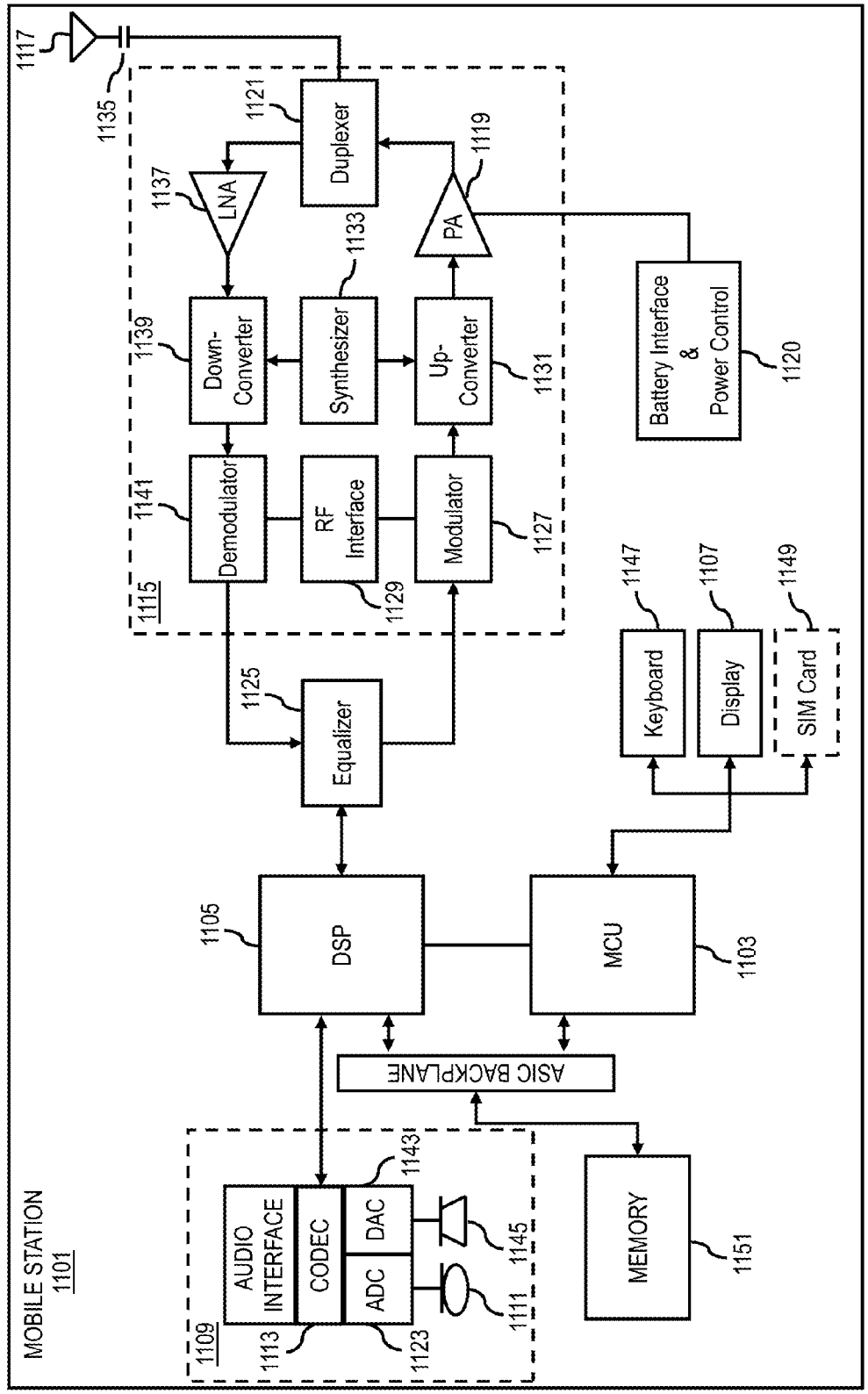
FIG. 11 is a diagram of a mobile terminal (e.g., handset) that can be used to implement an embodiment of the invention.

FIG. 11 is a diagram of exemplary components of a mobile terminal (e.g., handset) for communications, which is capable of operating in the system of FIG. 1, according to one embodiment. In some embodiments, mobile terminal 1100, or a portion thereof, constitutes a means for performing one or more steps of transferring data via RF memory tags. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry"

would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1103, a Digital Signal Processor (DSP) 1105, and a receiver/transmitter unit including a microphone gain control unit and a speaker gain control unit. A main display unit 1107 provides a display to the user in support of various applications and mobile terminal functions that perform or support the steps of transferring data via RF memory tags. The display 11 includes display circuitry configured to display at least a portion of a user interface of the mobile terminal (e.g., mobile telephone). Additionally, the display 1107 and display circuitry are configured to facilitate user control of at least some functions of the mobile terminal. An audio function circuitry 1109 includes a microphone 1111 and microphone amplifier that amplifies the speech signal output from the microphone 1111. The amplified speech signal output from the microphone 1111 is fed to a coder/decoder (CODEC) 1113.

A radio section 1115 amplifies power and converts frequency in order to communicate with a base station, which is included in a mobile communication system, via antenna 1117. The power amplifier (PA) 1119 and the transmitter/modulation circuitry are operationally responsive to the MCU 1103, with an output from the PA 1119 coupled to the duplexer 1121 or circulator or antenna switch, as known in the art. The PA 1119 also couples to a battery interface and power control unit 1120.

In use, a user of mobile terminal 1101 speaks into the microphone 1111 and his or her voice along with any detected background noise is converted into an analog voltage. The analog voltage is then converted into a digital signal through the Analog to Digital Converter (ADC) 1123. The control unit 1103 routes the digital signal into the DSP 1105 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 1125 for compensation of any frequency-dependent impairments that occur during transmission though the air such as phase and amplitude distortion. After equalizing the bit stream, the modulator 1127 combines the signal with a RF signal generated in the RF interface 1129. The modulator 1127 generates a sine wave by way of frequency or phase modulation. In order to prepare the signal for transmission, an up-converter 1131 combines the sine wave output from the modulator 1127 with another sine wave generated by a synthesizer 1133 to achieve the desired frequency of transmission. The signal is then sent through a PA 1119 to increase the signal to an appropriate power level. In practical systems, the PA 1119 acts as a variable gain amplifier whose gain is controlled by the DSP 1105 from information received from a network base station. The signal is then filtered within the duplexer 1121 and optionally sent to an antenna coupler 1135 to match impedances to provide maximum power transfer. Finally, the signal is transmitted via antenna 1117 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 1101 are received via antenna 1117 and immediately amplified by a low noise amplifier (LNA) 1137. A down-converter 1139 lowers the carrier frequency while the demodulator 1141 strips away the RF leaving only a digital bit stream. The signal then goes through the equalizer 1125 and is processed by the DSP 1105. A Digital to Analog Converter (DAC) 1143 converts the signal and the resulting output is transmitted to the user through the speaker 1145, all under control of a Main Control Unit (MCU) 1103—which can be implemented as a Central Processing Unit (CPU) (not shown).

The MCU 1103 receives various signals including input signals from the keyboard 1147. The keyboard 1147 and/or the MCU 1103 in combination with other user input components (e.g., the microphone 1111) comprise a user interface circuitry for managing user input. The MCU 1103 runs a user interface software to facilitate user control of at least some functions of the mobile terminal 1101 to transfer data via RF memory tags. The MCU 1103 also delivers a display command and a switch command to the display 1107 and to the speech output switching controller, respectively. Further, the MCU 1103 exchanges information with the DSP 1105 and can access an optionally incorporated SIM card 1149 and a memory 1151. In addition, the MCU 1103 executes various control functions required of the terminal. The DSP 1105 may, depending upon the implementation, perform any of a variety of conventional digital processing functions on the voice signals. Additionally, DSP 1105 determines the background noise level of the local environment from the signals detected by microphone 1111 and sets the gain of microphone 1111 to a level selected to compensate for the natural tendency of the user of the mobile terminal 1101.

The CODEC 1113 includes the ADC 1123 and DAC 1143. The memory 1151 stores various data including call incoming tone data and is capable of storing other data including music data received via, e.g., the global Internet. The software module could reside in RAM memory, flash memory, registers, or any other form of writable storage medium known in the art. The memory device 1151 may be, but not limited to, a single memory, CD, DVD, ROM, RAM, EEPROM, optical storage, or any other non-volatile storage medium capable of storing digital data.

An optionally incorporated SIM card 1149 carries, for instance, important information, such as the cellular phone number, the carrier supplying service, subscription details, and security information. The SIM card 1149 serves primarily to identify the mobile terminal 1101 on a radio network. The card 1149 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
receiving a request, at a device, to grant access for interaction between a first Radio Frequency (RF) memory tag and a second RF memory tag, the first RF memory tag being associated with two or more trusted storage areas in the device that store data that respectively require two or more different levels of security or protection;
determining an accessibility state of the first RF memory tag, the one or more trusted storage, or a combination thereof; and
causing, at least in part, granting of the access based, at least in part, on the accessibility state,
wherein the access is via a connection between the first RF memory tag and the second RF memory tag, and
wherein the first RF memory tag is associated with the device.

2. A method of claim 1, further comprising:
determining whether the first RF memory tag, one or more of the two or more trusted storage, or a combination thereof is in a locked state,
wherein the accessibility state is based, at least in part, on the determination of the locked state.

3. A method of claim 2, wherein the locked state is initiated if the first RF memory tag, the one or more of the two or more trusted storage, the device, or a combination thereof is lost or stolen.

4. A method of claim 1, further comprising:
determining authentication credentials associated with the first RF memory tag, the second RF memory tag, the device, a user of the device, one or more of the two or more trusted storage, or a combination thereof,
wherein the accessibility state is based, at least in part, on the authentication credentials.

5. A method of claim 1, further comprising:
determining one or more characteristics of the access, data associated with the access, or a combination thereof;
selecting one or more of the two or more trusted storage based, at least in part, on the one or more characteristics,
wherein the granting of the access is further based on the selected one or more of the two or more trusted storage.

6. A method of claim 1, wherein the access is a write operation from the second RF memory tag to the first RF memory tag, the method further comprising:
causing, at least in part, a first transfer of the content from the second RF memory tag to the first RF memory tag into an untrusted storage associated with the first RF memory tag; and
causing, at least in part, a second transfer of the content from the untrusted storage to at least one of the two or more trusted storage based, at least in part, on the granting of the access.

7. A method of claim 1, further comprising:
determining one or more limitations associated with the access,
wherein the granting of the access is further based on the one or more limitations.

8. A method of claim 1, wherein the request is further associated with a third RF memory tag, and wherein the granting of access relates to the first RF memory tag, the second RF memory tag, the third RF memory tag or a combination thereof.

9. A method of claim 1, further comprising:
causing, at least in part, synchronization, transfer, or a combination thereof of content associated with the first RF memory tag, one or more of the two or more trusted storage, the second RF memory tag, or a combination thereof to a server, another device, or combination thereof.

10. A method of claim 1, wherein the first RF memory tag is further associated with a user interface component:
causing, at least in part, accessing of the component by the device,
wherein the request is received, granted, or a combination thereof via the component at the device.

11. A method of claim 1, further comprising:
causing, at least in part, recording of the access; and
associating the recording with the first RF memory tag, one or more of the two or more trusted storage, the second RF memory tag, or a combination thereof.

12. A method of claim 1, wherein the access relates to obtaining consent information, and wherein the granting of the access is further based on the consent information.

13. A method of claim 12, further comprising:
determining one or more areas of the trusted storage based, at least in part, on the consent information,
wherein the access further relates to the one or more areas of the trusted storage.

14. A method of claim 12, further comprising:
determining a scope of the access based, at least in part, on the consent information,
wherein the scope includes at least a time, a location, a duration, a party, a role of the party, an activity, a record, or a combination thereof.

15. A method of claim 1, wherein the access relates to a financial transaction, financial information, medical information, personal information, privileged information, or a combination thereof.

16. An apparatus comprising:
at least one processor; and
at least one memory including computer program code for one or more programs,
the at least one memory and the computer program code configured to, with the at least one processor, cause the apparatus to perform at least the following,
receive a request, at a device, to grant access for interaction between a first RF memory tag and a second RF memory tag, the first RF memory tag associated with two or more trusted storage areas in the device that store data that respectively require two or more different levels of security or protection;
determine an accessibility state of the first RF memory tag, the one or more trusted storage, or a combination thereof; and
cause, at least in part, granting of the access based, at least in part, on the accessibility state,
wherein the access is via a connection between the first RF memory tag and the second RF memory tag, and
wherein the first RF memory tag is associated with the device.

17. An apparatus of claim 16, wherein the apparatus is further caused to:
determine whether the first RF memory tag, one or more of the two or more trusted storage, or a combination thereof is in a locked state,
wherein the accessibility state is based, at least in part, on the determination of the locked state.

18. An apparatus of claim 16, wherein the apparatus is further caused to:
determine authentication credentials associated with the first RF memory tag, the second RF memory tag, the device, a user of the device, one or more of the two or more trusted storage, or a combination thereof, wherein the accessibility state is based, at least in part, on the authentication credentials.

19. An apparatus of claim 16, wherein the apparatus is further caused to:
   determine one or more characteristics of the access, data associated with the access, or a combination thereof;
   select one or more of the two or more trusted storage based, at least in part, on the one or more characteristics,
   wherein the granting of the access is further based on the selected one or more of the two or more trusted storage.

20. An apparatus of claim 16, wherein the apparatus is further caused to:
   cause, at least in part, synchronization, transfer, or a combination thereof of content associated with the first memory tag, one or more of the two or more trusted storage, the second memory tag, or a combination thereof to a server, another device, or combination thereof.

* * * * *